(12) United States Patent
Zhu

(10) Patent No.: US 11,128,470 B2
(45) Date of Patent: *Sep. 21, 2021

(54) METHODS AND SYSTEMS FOR AUTOMATIC BLOCKCHAIN DEPLOYMENT BASED ON CLOUD PLATFORM

(71) Applicant: Advanced New Technologies Co., Ltd., Grand Cayman (KY)

(72) Inventor: Ming Zhu, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,838

(22) Filed: May 29, 2020

(65) Prior Publication Data

US 2020/0403801 A1 Dec. 24, 2020

Related U.S. Application Data

(63) Continuation of application No. 16/775,828, filed on Jan. 29, 2020, now Pat. No. 10,725,803, which is a
(Continued)

(51) Int. Cl.
*H04L 29/06* (2006.01)
*H04L 9/32* (2006.01)
(Continued)

(52) U.S. Cl.
CPC ............ *H04L 9/3239* (2013.01); *G06F 9/455* (2013.01); *H04L 9/083* (2013.01); *H04L 9/3297* (2013.01); *H04L 67/10* (2013.01); *H04L 2209/38* (2013.01)

(58) Field of Classification Search
None
See application file for complete search history.

(56) References Cited

U.S. PATENT DOCUMENTS

2012/0110636 A1* 5/2012 Van Biljon ............ H04L 67/10
726/1
2019/0317924 A1* 10/2019 Alimi .................... H04L 9/0891
(Continued)

FOREIGN PATENT DOCUMENTS

| CN | 107196934 A | 9/2017 |
|---|---|---|
| CN | 108305194 A | 7/2018 |
| WO | WO 2018223042 A1 | 12/2018 |

OTHER PUBLICATIONS

Pan, J. et al., EdgeChain: An Edge-IoT Framework and Prototype Based on Blockchain and Smart Contracts, IEEE Internet of Things Journal, vol. 6, No. 3, Jun. 2019, 14 pages. (Year: 2019).*
(Continued)

*Primary Examiner* — Andrew J Steinle
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for automatic blockchain deployment. One of the methods includes: causing a virtual computing environment to be created at a computer, the computer connecting to a cloud platform; generating an initial block of a blockchain transmitting the initial block of the blockchain to the cloud platform; causing the blockchain to be initialized at the virtual computing environment; and after initialization of the blockchain is completed, monitoring the blockchain based on the cloud platform.

19 Claims, 6 Drawing Sheets

Related U.S. Application Data continuation of application No. PCT/CN2019/092318, filed on Jun. 21, 2019.

(51) Int. Cl.
  *G06F 9/455* (2018.01)
  *H04L 9/08* (2006.01)
  *H04L 29/08* (2006.01)

(56) References Cited

U.S. PATENT DOCUMENTS

2019/0325532 A1* 10/2019 Torrenegra ......... G06Q 10/1053
2020/0082398 A1* 3/2020 Xu ..................... G06Q 20/401

OTHER PUBLICATIONS

International Search Report of Application No. PCT/CN2019/092318, dated Mar. 25, 2020.
Written Opinion of the International Searching Authority for Application No. PCT/CN2019/092318, issued by the ISA/CN, National Intellectual Property Administration, PRC, Beijing, China, dated Mar. 25, 2020.
Extended European Search Report in European Application No. 19763540.2, dated Aug. 13, 2020.
Pan, J. et al., EdgeChain: An Edge-IoT Framework and Prototype Based on Blockchain and Smart Contracts, IEEE Internet of Things Journal, vol. 6, No. 3, Jun. 2019, 14 pages.
Williams, N., How to Set Up a Private Ethereum Blockchain in 20 Minutes, ARCTOUCH, Feb. 28, 2018, 9 pages.
Yammanuru, P. R., et al., Enabling Enterprise Blockchain AppDev Teams, 2017 23rd Annual Conference on Advanced Computing and Communications (ADCOM), IEEE, Sep. 8, 2017, 6 pages.
ConsenSys, Everything Enterprises Need to Know About Amazon's Blockchain as a Service, Jan. 7, 2019, 14 pages.
Written Opinion for Application No. 11202001888U, issued by the Intellectual Property Office of Singapore, dated Nov. 19, 2020.

* cited by examiner

METHODS AND SYSTEMS FOR AUTOMATIC BLOCKCHAIN DEPLOYMENT BASED ON CLOUD PLATFORM

CROSS REFERENCE TO RELATED APPLICATIONS

This application is a continuation of U.S. application Ser. No. 16/775,828, filed on Jan. 29, 2020, which is a continuation of International Application No. PCT/CN2019/092318, filed Jun. 21, 2019, the entire contents of all of which are incorporated herein by reference.

TECHNICAL FIELD

The specification generally relates to computer technologies, and more particularly, to methods and devices for automatic blockchain deployment based on a cloud platform.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

Blockchain systems have been used in scenarios with high requirements of openness, transparency, and immutability of stored data. Based on smart contracts, blockchain applications are used in scenarios such as supply chain finance or invoices. Traditionally, a blockchain system is deployed manually. Therefore, there is a need for fast and reliable automatic blockchain deployment, which may enable users to focus on developing blockchain applications rather than technical details of deploying a blockchain system.

SUMMARY

In one aspect, there is provided a computer-implemented method for automatic blockchain deployment. The method includes: causing a virtual computing environment to be created at a computer, the computer connecting to a cloud platform; generating an initial block of a blockchain and transmitting the initial block of the blockchain to the cloud platform; causing the blockchain to be initialized at the virtual computing environment; and after initialization of the blockchain is completed, monitoring the blockchain based on the cloud platform.

In another aspect, there is provided a device for automatic blockchain deployment. The device includes one or more processors and one or more computer-readable memories coupled to the one or more processors and having instructions stored thereon. The instructions are executable by the one or more processors to cause a virtual computing environment to be created at a computer, the computer connecting to a cloud platform; generate an initial block of a blockchain and transmit the initial block of the blockchain to the cloud platform; cause the blockchain to be initialized at the virtual computing environment; and after initialization of the blockchain is completed, monitor the blockchain based on the cloud platform.

In yet another aspect, there is provided a non-transitory computer-readable medium that has stored therein instructions that, when executed by a processor of a device, cause the device to perform a method for automatic blockchain deployment. The method includes: causing a virtual computing environment to be created at a computer, the computer connecting to a cloud platform; generating an initial block of a blockchain and transmitting the initial block of the blockchain to the cloud platform; causing the blockchain to be initialized at the virtual computing environment; and after initialization of the blockchain is completed, monitoring the blockchain based on the cloud platform.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
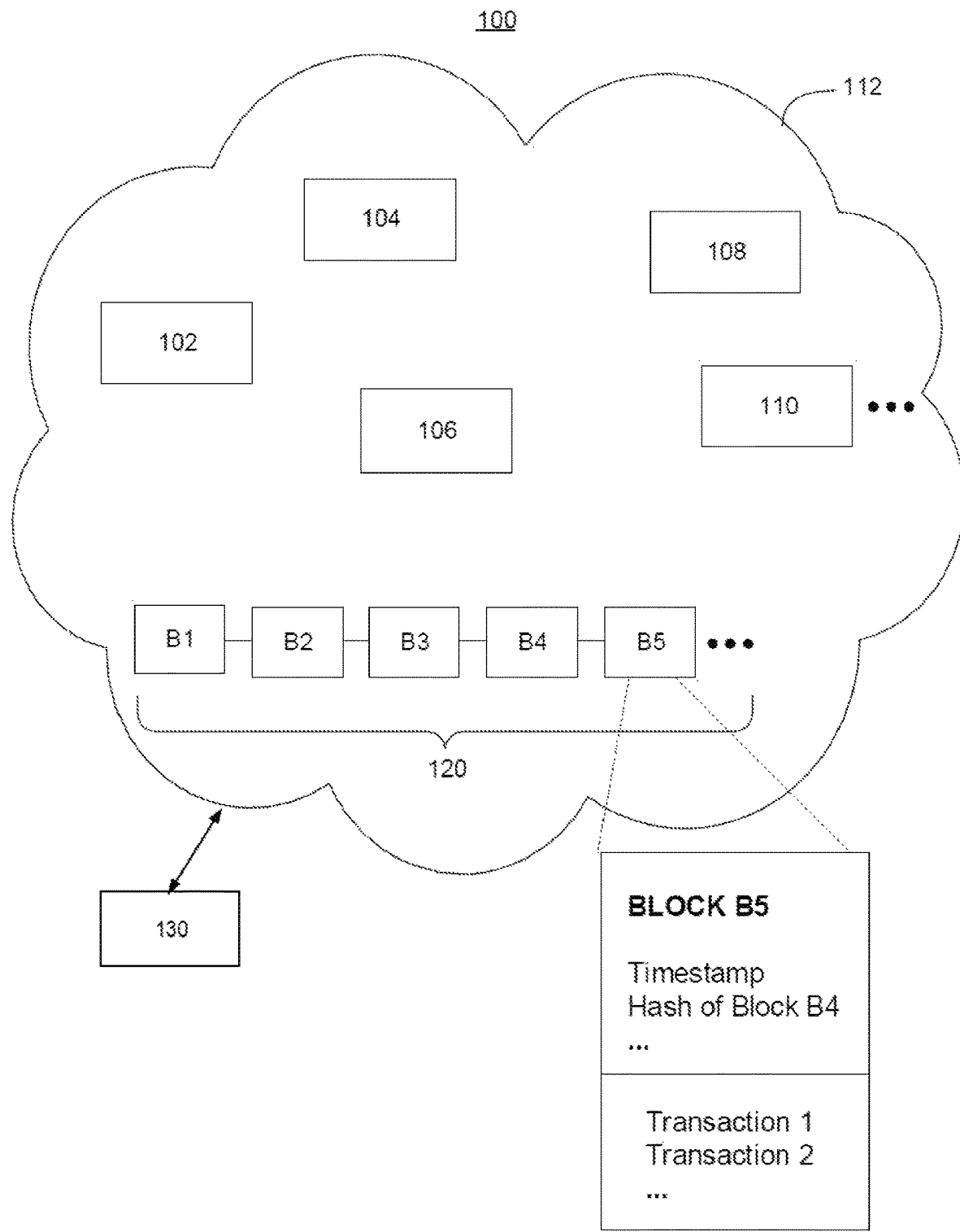
FIG. 1 is a schematic diagram of a blockchain system, according to an embodiment.

Embodiments of the specification provide methods and devices for implementation of a blockchain as a service (BaaS) system for automatic and reliable blockchain deployment. For example, a BaaS system may provide blockchain service providers with a service platform to create, manage, and maintain a blockchain and blockchain-based applications. The methods and devices allow one or more processors of a BaaS system to cause a node of a blockchain to be created in a virtual computing environment, which is dynamically created at a computer connecting to a cloud platform. After the virtual computing environment is created, the one or more processors may generate an initial block of the blockchain and upload it to a storage of the cloud platform. If the upload is completed, the one or more processors may notify the virtual computing environment to initialize the blockchain, such as by using a message queue of the cloud computing platform, or implement a timed retransmission mechanism if such transmission is incomplete. When the virtual computing environment is notified, it may download the initial block from the storage and start a blockchain application using the initial block. When the blockchain is successfully initialized (e.g., completed without error), the virtual computing environment may serve as a node of the blockchain system. The one or more processors may then add the node into a monitoring service of the cloud platform. The monitoring service may monitor an operation status of the blockchain and provide a blockchain browser for a user to browse information about the operation status.

Embodiments disclosed in the specification have one or more technical effects. In some embodiments, the methods and devices of deploying a blockchain using a BaaS system enable fast development and easy usage of blockchains and blockchain-based applications and provide abilities of development and use of the blockchains with low costs, high security, high reliability, standardized quality, and elastic and dynamic scalability.

In some embodiments, the methods and devices enable automatic blockchain deployment by use of the ability of the cloud platform, such as an elastic computing service, to automate and manage the process of creation of virtual computing environment. This allows the deployed blockchain system with the abilities to elastically or dynamically scale in accordance with service demands, and also allows users of the BaaS system to focus on development of blockchain applications and fast deployment of blockchain-based services, which may release the users from building, maintaining, and managing the blockchain system itself, therefore boosting and promoting a wider use of the blockchain technology. In some embodiments, the methods and devices provide the cloud platform with the abilities to automatically reattempt the deployment of the blockchain to avoid deployment interruption due to unexpected failure by use of a notification mechanism, such as a message queue mechanism. This allows the one or more processors of the BaaS system to coordinate with the created virtual computing environment to ensure the process of the automatic blockchain deployment is correctly performed, which reduces or eliminates artificial interference thereof.

In some embodiments, the methods and devices provide the abilities to deploy a blockchain system in a hybrid cloud environment. The computer for creating the virtual computing environment is not limited to one of the computers in the cloud platform, and it can be a computer outside in the cloud platform, such as a computer provided by a client of the cloud platform (e.g., a computer of a private cloud of the client) or a computer in a different cloud platform (e.g., a public cloud platform). As long as the computer has a unique network address (e.g., an Internet Protocol or IP address), the virtual computing environment may be created at the computer. This allows the blockchain with the abilities to be deployed with fewer limitations and more flexibilities to computing resources, and also allows the users of the blockchain with more degrees of control on the design and structure of the deployed blockchain system.

In some embodiments, the methods and devices provide the abilities of uniform and node-failure-proof blockchain deployment by uploading an initial block of a blockchain to a storage of the cloud platform. This may enable all nodes of a blockchain to synchronize the initial block by downloading it from the storage before initializing the blockchain, and thus eliminates the need for the BaaS system to repeatedly creating the initial block and allows convenient, fast, automatic, and reliable blockchain deployment.

In some embodiments, the methods and devices provide the abilities of uniform monitoring and managing the deployed blockchain system. The monitoring service provides a blockchain browser to users of the blockchain to monitor an operation status thereof. This allows the users to save computing resources in implementing such a blockchain browser for the users. The monitoring service also provides the BaaS system with the abilities of centrally monitoring all deployed blockchains. This allows a provider of the BaaS system to save computing resources in separately monitoring the deployed blockchain system and conveniently upgrading the monitoring service.

A blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be validated and added to the blockchain of the blockchain network. Examples of public blockchain networks include particular peer-to-peer payment networks that leverage a distributed ledger, referred to as a blockchain.

In general, a public blockchain network may support public transactions. A public transaction is shared with all of the nodes in the public blockchain network, and is stored in a global blockchain. A global blockchain is a blockchain replicated across all nodes, and all nodes are in consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in some cryptocurrency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permission networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10)

entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a subset of entities (nodes) (e.g., at least 7 entities) must sign every block in order for the block to be validated and added to the blockchain.

In general, a BaaS system may integrate computing, network, and storage resources and provide blockchain service providers with uniform, customizable, and programmable interfaces for blockchain-based application development and supporting facilities. The BaaS system may modularize its provided services, such as blockchain network building, encryption, consensus, resource management, user management, or operation management. Such services may be implemented as software or processes running in computing environments. In some embodiments, the modules of the BaaS system may be provided as plugins or software development kits (SDKs). Users of the BaaS system may use those modules and focus on developing blockchain applications, such as smart contracts, cryptocurrencies, or token managers.

FIG. 1 illustrates a schematic diagram of a blockchain system 100, according to an embodiment. Referring to FIG. 1, the blockchain system 100 may include a plurality of nodes, e.g., nodes 102-110, configured to operate on blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, the block B5 may include a timestamp, a cryptographic hash of the block B4, and transaction data of the block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

In some embodiments, the blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart contract may include a plurality of subroutines or functions, each of which may be a sequence of program instructions that perform a specific task. The smart contract may be operational codes that are fully or partially executed without human interaction.

As each of the nodes 102-110 may store a copy of the blockchain 120, each of the nodes 102-110 may also have access to a copy of the smart contract included in the blockchain 120. In some embodiments, the smart contract may be assigned with an address on the blockchain 120, e.g., after the smart contract is compiled into operational code. The address of the smart contract is configured to locate the smart contract on the blockchain 120.

In some embodiments, a node (e.g., node 102) in the blockchain system 100 may perform a transaction based on a copy of the smart contract. After a new block including the transaction is broadcasted to the blockchain system 100, other nodes in the blockchain system 100 may verify the new block. After the new block is verified by a majority or all of the nodes in the blockchain system 100, the new block may be added to respective copies of the blockchain 120 on those nodes, and the transaction is complete.

In some embodiments, a device 130 may be used to create, manage, and maintain the blockchain system 100. The device 130 may include a communication interface, a processor, and a memory. In some embodiments, a BaaS manager service may be run on the device 130 to cause creating, manage, and maintain the blockchain system 100. Communication between the device 130 and the blockchain system 100 may be established through one or more application programming interfaces (APIs). Software development kits (SDKs) may also be provided to facilitate the establishment of such communication.

Figure 2:
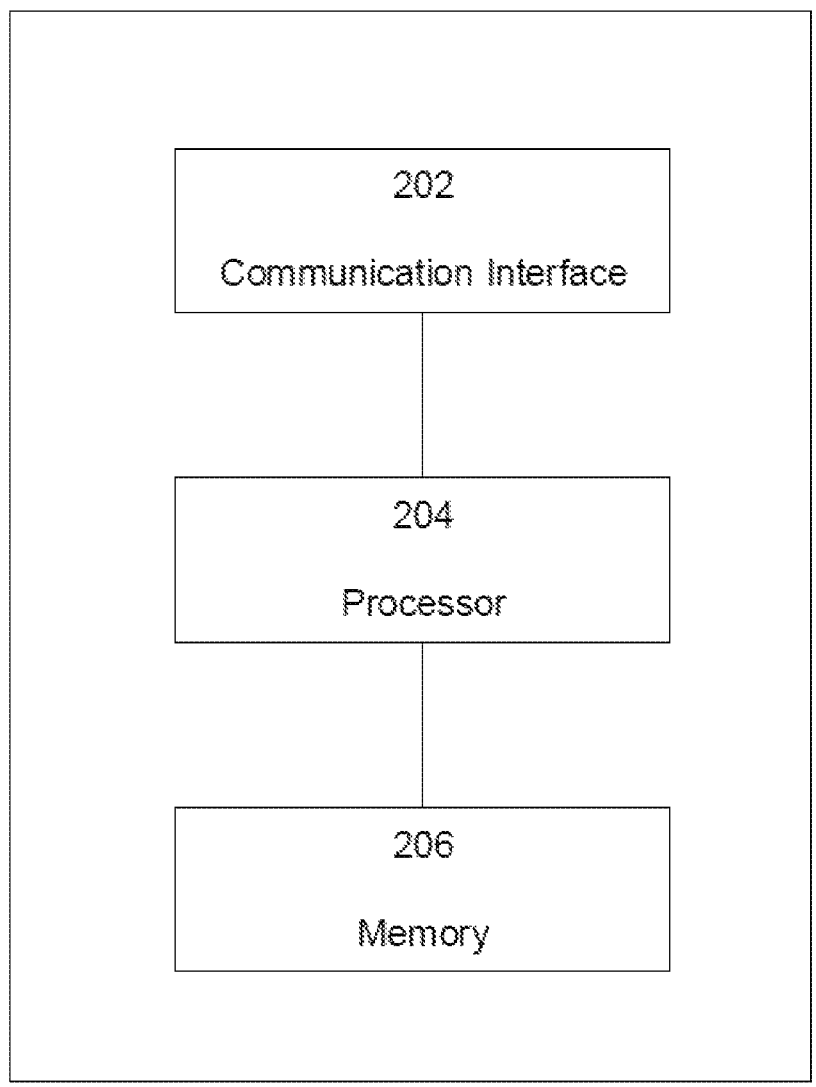
FIG. 2 is a schematic diagram of a device for implementing a node in a blockchain system, according to an embodiment.

FIG. 2 illustrates a schematic diagram of a device 200 for implementing a node, e.g., the node 102 (FIG. 1), in a blockchain system, according to an embodiment. Referring to FIG. 2, the device 200 may include a communication interface 202, a processor 204, and a memory 206.

The communication interface 202 may facilitate communications between the device 200 and other nodes, e.g., the nodes 104-110 (FIG. 1), in the network. In some embodiments, the communication interface 202 is configured to support one or more communication standards, such as an Internet standard or protocol, an Integrated Services Digital Network (ISDN) standard, etc. In some embodiments, communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, communication interface 202 may be based on public cloud infrastructure, private cloud infrastructure, hybrid public/private cloud infrastructure.

The processor 204 may include a central processing unit (CPU) or a graphics processing unit (GPU). In some embodiments, the processor 204 may include one or more dedicated processing units, application-specific integrated circuits (ASICs), field-programmable gate arrays (FPGAs), or various other types of processors or processing units. The processor 204 is coupled with the memory 206 and is configured to execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the device 200 may perform an operation on the blockchain 120.

The device 200 may implement the node as a virtual computing environment. The virtual computing environment may be generated using software virtualization technologies to emulate an independent computer using computing resources (e.g., processor cores, portions of memories, portions of storage spaces, portions of bandwidths) of one or more devices 200. In some embodiments, one or more virtual computing environments may be emulated on one device 200. In some embodiments, the computing resources used to generate a virtual computing environment may be from multiple network-connected physical computers, such as multiple devices 200. In some embodiments, the virtual computing environment may include at least one processor core of a physical machine, a portion of a memory of the physical machine, and a network interface.

Figure 3:
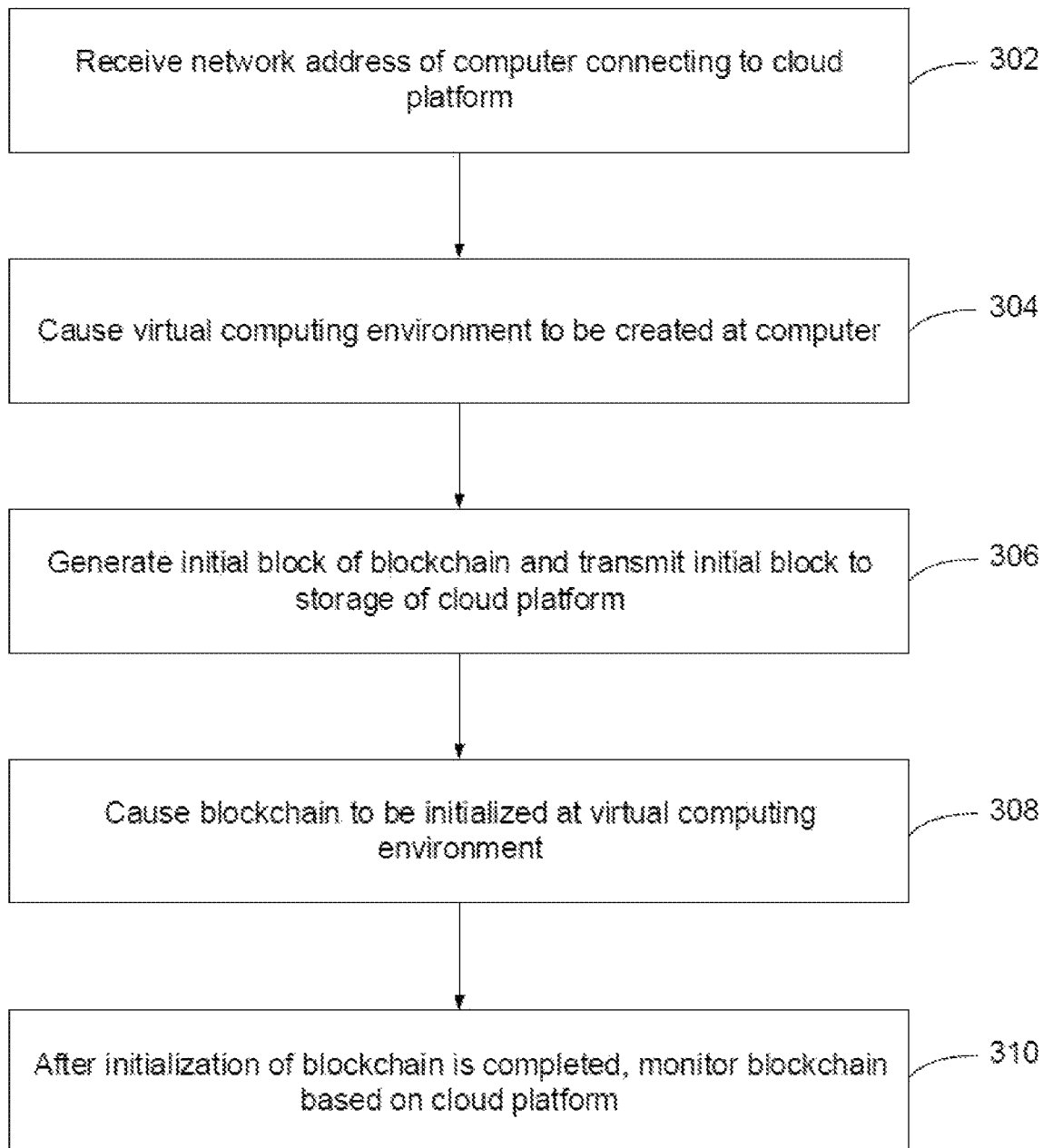
FIG. 3 is a flow chart of a method for automatic blockchain deployment, according to an embodiment.

FIG. 3 illustrates a flow chart of a method 300 for automatic blockchain deployment, according to an embodiment. For example, the method 300 may be performed by a managing service of a BaaS system associated with a cloud platform. The BaaS system may include one or more processors and one or more computer-readable memories coupled to the one or more processors and having instructions stored thereon, which are executable by the one or more processors to perform processes, such as the method 300. In some embodiments, the deployed blockchain system may be the blockchain system 100 (FIG. 1).

Referring to FIG. 3, at step 302, one or more processors, e.g., of the BaaS system, receives a network address of a computer connecting to a cloud platform including, e.g., a set of computers. The cloud platform may be provided by a cloud service provider (e.g., a public or private cloud service provider). In some embodiments, the cloud service provider may also be a BaaS service provider. In some embodiments, the network address of the computer may include an Internet Protocol (IP) address. For example, the IP address may be an internal IP address (e.g., assigned by a local network) or an external IP address (e.g., assigned by an Internet service provider). Generally, the IP address of the computer is unique, and is different from IP addresses of the set of computers in the cloud platform.

The computer may be any computer with an accessible and unique network address. In some embodiments, the computer may be a computer in the cloud platform, such as one of the set of computers. In some embodiments, the computer may be managed by an application container management service (e.g., Kubernetes' or stylized as "k8s") of the cloud platform. In some embodiments, the computer may be managed by a cloud-native cluster management service of the cloud platform. For example, the computer may not be managed by Kubernetes®.

In some embodiments, the computer may be a computer not in the cloud platform. For example, the computer may not be in any cloud platform, such as operate as an independent computer of a user of the BaaS system, or a computer in a computer cluster of the user. For another example, the computer may be in an external cloud platform and may be a computer of a public cloud platform provided by a different cloud service provider than that providing the set of computers, a private cloud platform provided by the user, or a hybrid cloud platform. The hybrid cloud platform may be, for example, a cloud platform combining at least a computer of the public cloud platform and at least a computer of the private cloud platform.

Still referring to FIG. 3, at step 304, the one or more processors cause a virtual computing environment to be created at the computer, e.g., based on the network address of the computer. For example, the one or more processors may send instructions of creating the virtual computing environment to the cloud platform, and the cloud platform may create the virtual computing environment following the instructions. In some embodiments, the virtual computing environment may be implemented as an equivalent of a physical computing environment, such as by using computing resources of the physical computing environment to create the virtual computing environment. In some embodiments, the virtual computing environment may include at least one processor core of a physical machine, a portion of a memory of the physical machine, a network interface, and an operating system. For example, the physical machine may include multiple physical processor cores, and at least one of those physical processor cores may be assigned to the virtual computing environment as a virtual processor. The physical machine may also include a physical memory, and at least a portion of the physical memory may be assigned to the virtual computing environment as a virtual memory.

In some embodiments, the virtual computing environment may further include a storage space (e.g., a portion of a disk of the physical machine), a network bandwidth (e.g., a portion of the network bandwidth of the physical machine), a network address (e.g., an IP address), a port number for data communication, a network firewall, or other computing components. In some embodiments, an elastic computing service (ECS) of the cloud platform may be used to automate creation, management, and maintenance of the virtual computing environment. For example, the ECS may access the computer using the network address, and create thereon the virtual computing environment. The virtual computing environment may have various specifications, configurations, or capabilities, such as different numbers of processor cores, different sizes of memories, different sizes of storage spaces, and different network performances (e.g., network bandwidths). In some embodiments, the one or more processors may cause multiple virtual computing environments to be created in one or more computers connected to the set of computers, each of the one or more computers having a unique network address. Each of the virtual computing environment may be independent.

In some embodiments, when performing step 304, distributed lock may be applied. For example, the distributed lock may be an operation used in a distributed system (e.g., the cloud platform) to avoid interferences between concurrent operations at the same shared computing resource (e.g., processor core, memory space, storage space, bandwidth, etc.). For example, the one or more processors may substantially concurrently cause multiple virtual computing environments to be created at the same computer for deploying multiple blockchain systems. Creating the virtual computing environments may assign the shared computing resources of the computer to the respective virtual computing environments. To avoid interferences or conflicts between independent processes running on the computer, the distributed lock may be used for exclusive permission ("lock") of, e.g., a single operation to the shared computing resources. When the shared computing resources are locked by an operation, no other operation may be permitted. For example, the distributed lock may be implemented based on a database, such as by adding an entry to a commonly accessible database when locking the shared computing resources, and deleting the entry when releasing the shared computing resources. For another example, the distributed lock may be implemented based on a cache, such as by replacing the aforementioned commonly accessible database with a commonly accessible cache.

In some embodiments, the one or more processors may apply the distributed lock to shared resources of the computer. After applying the distributed lock, the one or more processors may cause the virtual computing environment to be created using the shared resources of the computer. After the virtual computing environment is created, the one or more processors may release the distributed lock.

In some embodiments, after step 304, the one or more processors may cause an identity of the virtual computing environment to be created before proceeding to perform step 306. For example, the one or more processors may cause the virtual computing environment to generate the identity. In some embodiments, in response to the virtual computing environment being created at the computer, the one or more processors may cause a pair of a public key and a private key to be generated. The pair may represent an identity of the virtual computing environment. In response to receiving one of the public key or the private key, the one or more processors may generate an initial block of a blockchain. In some embodiments, the public and private keys may be generated using an asymmetric cryptography algorithm, such as an RSA algorithm, ElGamal algorithm, or elliptic curve cryptography (ECC) algorithm. By doing so, the virtual computing environment may not be attacked or abused by malicious parties and thus protect the security of the blockchain.

In some embodiments, the key pair may be generated using one-time program code. For example, the one-time program code may be stored at and executed by the virtual computing environment. In other words, the key pair may be generated locally at the virtual computing environment. After generating the key pair, the one-time program code may be destroyed. In some embodiments, the key pair may be generated using a security service, e.g., a key management service (KMS). For example, in response to the virtual computing environment being created at the computer, the one or more processors may send a request for generating the key pair to the security service. After the security service generates the key pair, the one or more processors may receive one of the public key or the private key from the security service. In some embodiments, the security service may be integrated as a part of the cloud platform. In some embodiments, the security service may be implemented as an independent service (e.g., not integrated into the cloud platform) connected to the cloud platform, the BaaS system, and the virtual computing environments, such as a third-party service.

In some embodiments, the private key may be exclusively stored in and used by the virtual computing environment for encryption or decryption. The public key may be sent to other computing environments of the cloud platform and the BaaS system for encryption or decryption. Such encryption and decryption may conform to a cryptography standard, such as X.509 protocol.

In some embodiments, for secured data transmission between nodes of the blockchain system, the one or more processors may store the public key associated with the virtual computing environment at the security service (e.g., a storage space of the security service), and store the private key associated with the virtual computing environment at the virtual computing environment. For example, when sending outbound data to the other computing environments, the virtual computing environment may encrypt a hashed portion (referred to as "digest") of the outbound data using its private key and include the encrypted digest in the encrypted outbound data, the process of which may be referred to as "signing." When the other computing environments receive the signed outbound data, the other computing environments may decrypt the encrypted digest in the signed outbound data using the public key of the virtual computing environment, and compare the decrypted digest with a re-generated digest of the outbound data (e.g., by re-hashing the decrypted outbound data). If the decrypted digest and the re-generated digest are the same, the outbound data may be deemed as authenticated. In some embodiments, the other computing environments may retrieve the public key from the security service.

In some embodiments, after generating a key pair for an instant virtual computing environment, the one or more processors may cause multiple virtual computing environments to store at least one of the public key or the private key, e.g., the public key, of the key pair. In some embodiments, the multiple virtual computing environments may include the instant virtual computing environment. In some embodiments, the one or more processors may assign weights to the multiple virtual computing environments. For example, the virtual computing environments may be respectively assigned with weights of 0.5, 0.6, 0.7, 0.8, 0.9, 1.0, or any other appropriate weight values, which is not limited here. In some embodiments, the one or more processors may assign the weights of the multiple virtual computing environments by recording them in a storage (e.g., a database, a table, or any appropriate data structure) of the BaaS system.

When generating the initial block for the instant virtual computing environment, the one or more processors may receive public keys, each corresponding to the public key for the instant virtual computing environment, from some or all of the multiple virtual computing environments, and determine a sum of the weights respectively assigned thereto. When the sum is greater than or equal to a predetermined threshold value (e.g., 0.85), the one or more processors may determine the identity of the instant virtual computing environment, and include the received public keys and the weights assigned to the virtual computing environments where the public keys are received from in the initial block as a representation of the identity of the instant virtual computing environment.

In some embodiments, the one or more processors may further create an identity of the BaaS system before proceeding to perform step 306. In some embodiments, the identity of the BaaS system may also be generated as a pair of a public key and a private key. For example, the one or more processors may generate the key pair using one-time program code stored at computers of the BaaS system. In other words, the key pair may be generated locally at the BaaS system. After generating the key pair, the one-time program code may be destroyed. As another example, the key pair may be generated using the security service (e.g., the KMS). After the security service generates the key pair, the one or more processors may receive one of the public key or the private key, e.g., the public key, from the security service. In some embodiments, in response to receiving one of the public key or the private key, the one or more processors may further include the identity of the BaaS system in the initial block of a blockchain.

In some embodiments, after the virtual computing environment is created, the one or more processors may generate an initial block of the blockchain. For example, when the virtual computing environment is successfully created (e.g., created without error), the virtual computing environment may send a message to the one or more processors to indicate so, and the one or more processors may start performing step 306.

Still referring to FIG. 3, at step 306, the one or more processors may generate an initial block of a blockchain and transmit the initial block to a storage of the cloud platform. By uploading the initial block to the storage device, virtual computing environments may download the initial block for initializing the blockchain. In such cases, the one or more processors may not need to regenerate the initial block each time a new node of the blockchain system is implemented in a newly created virtual environment. Alternatively and/or additionally, if the one or more processors cannot correctly generate the initial block during deployment of the blockchain system, the deployment of the blockchain system may not be affected because the initial block stored in the storage may be downloaded for initializing the blockchain at newly added nodes.

In some embodiments, the initial block may include at least one of the network address of the virtual computing environment, the port number of the virtual computing environment, an identity of the virtual computing environment, or an initial smart contract. The identity of the virtual computing environment may include any means of identifying the identity thereof, such as an identifier, a public key, or a private key. The public or private key may be generated using a security service, such as a KMS.

In some embodiments, the initial smart contract may include at least one of a configuration smart contract for configuring blocks in the blockchain or a node smart contract for setting node configurations in the blockchain. For example, the configuration smart contract may include conditions for configuring block sizes, block generation times, or other block-related specifics. For another example, the node smart contract may include conditions for adding nodes (e.g., implemented at new virtual computing environments) to the blockchain system, removing nodes from the blockchain system, assigning network addresses to nodes of the blockchain system, or other node-related specifics.

In some embodiments, the one or more processors may transmit or upload the initial block to a distributed storage of the cloud platform. The distributed storage may be implemented using various storage architectures, such as an object-based storage architecture that manages data as objects, a file system storage architecture that manages data as a file hierarchy, or a block storage architecture that manages as blocks within sectors or tracks of a hard disk. For example, the distributed storage may be implemented as an object storage service (OSS) that uses the object-based storage architecture. In the OSS, for example, data objects may include data itself, metadata thereof, and an identifier. The OSS may be used to store any intermediately produced data during the deployment of the blockchain, such as the initial block.

Still referring to FIG. 3, at step 308, the one or more processors cause the blockchain to be initialized at the virtual computing environment. In some embodiments, in response to completed transmission (e.g., confirmed by an acknowledgment message) of the initial block to the storage at step 306, the one or more processors may send a message indicative of the completed transmission to a message queue of the cloud platform. The message may be received by the virtual computing environment for initializing the blockchain. For example, a message is a piece of data or information communicated between modules or services of the cloud platform and the BaaS system. The message may carry information of a completed operation, a request for an operation, or a status of an operation. The message queue may be a middleware for transferring messages communicated between the modules or the services. In some embodiments, the message queue may enable the modules to send, receive, subscribe, track, broadcast, resend, or inquire messages.

In some embodiments, the message queue may provide asynchronous message transfer, in which messages may be sent to a storage of the message queue and stored therein until delivery is completed. If delivery of a message fails, the message queue may reattempt the delivery until the delivery succeeds. For example, in response to the completed transmission of the initial block, the one or more processors may determine whether sending the message to the message queue is completed. If so, the one or more processors may initialize the blockchain at the virtual computing environment. Otherwise, the one or more processors may resend the message to the message queue after a predetermined period of time. Using the message queue may ensure that communications between modules and services of the cloud platform and the BaaS system would not be lost, and thus further ensure the correct procedures of automatic blockchain deployment.

In some embodiments, to ensure the communication between modules and services of the cloud platform and the BaaS system, mechanisms other than the message queue may also be used. For example, in response to transmitting the initial block to the storage, the one or more processors may determine whether such transmission is completed. If so (e.g., confirmed by an acknowledgment message), the one or more processors may initialize the blockchain at the virtual computing environment. Otherwise, the one or more processors may retransmit the initial block to the storage after a predetermined period of time. In some embodiments, to record the stage of the deployment without using the message queue, a flag or a status indicator may be stored in the cloud platform (e.g., in a database) to represent such stage (e.g., succeeding or failing in the transmission of the initial block). By checking the flag or status indicator, the one or more processors may also determine whether the transmission of the initial block to the storage device is completed.

Figure 4:
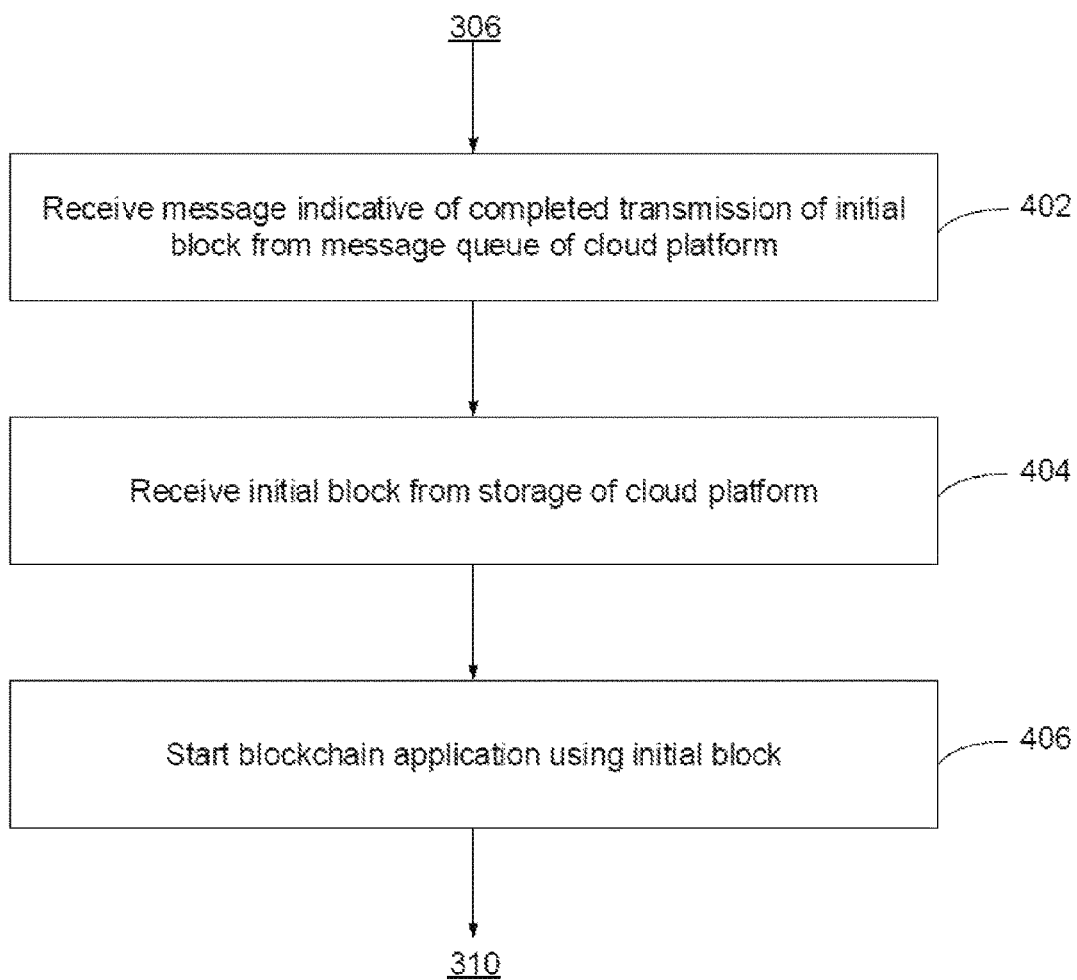
FIG. 4 is a flow chart of a method for automatic blockchain deployment, according to an embodiment.

In some embodiments, step 308 may include further sub-steps. FIG. 4 is a flow chart of a method 400 for automatic blockchain deployment, according to an embodiment. For example, the method 400 may be performed by a virtual computing environment implemented by the device 200 (FIG. 2). In some embodiments, the method 400 may be implemented as the following process of step 306 of the method 300 (FIG. 3).

Referring to FIG. 4, at step 402, one or more processor cores, e.g., of the virtual computing environment, receive the message indicative of the completed transmission of the initial block from the message queue.

At step 404, the one or more processor cores receive (e.g., download) the initial block from the storage.

In some embodiments, after step 402, the one or more processor cores may delete files (e.g., stored in a storage space) and program processes (e.g., running in a memory) from the virtual computing environment. For example, the deleted files and program processes are not associated with the deployment of the blockchain. After deleting those files and program processes, the one or more processor cores proceed to perform step 404. For example, such files and program processes may be remainder of a previously deployed blockchain. Those files and program processes may result from unexpected interruption of the previous deployment, and may affect the current deployment. By deleting those files and processes, potential interferences to the current blockchain deployment may be minimized.

At step 406, the one or more processor cores start a blockchain application using the initial block. The initial block may include data or information for starting the blockchain application. After starting the blockchain application, the blockchain may be initialized and become able to provide blockchain-based functions and services, and the virtual computing environment may become a node of the blockchain.

Referring back to FIG. 3, at step 310, after initialization of the blockchain is completed, the one or more processors may monitor the blockchain based on the cloud platform, e.g., by using a monitoring service of the cloud platform. For example, the one or more processors may add the deployed blockchain to the monitoring service. The monitoring service may provide various tools and functions to users of the blockchain.

In some embodiments, the monitoring service may provide users with a function of monitoring a status of the blockchain. For example, the status may include at least one of a synchronization status of blocks of the blockchain, a height of the blockchain in the virtual computing environment, network connectivity between blockchain nodes, computing resource usage of the blockchain nodes, or service statuses of the blockchain nodes. In some embodiments, the monitoring service may extract information associated with the blocks from the blockchain. For example, during operation of the blockchain, the virtual computing environment may access or connect to a database (e.g., a relational database service or RDS) for storing information of blocks (e.g., a height or a topology of the blockchain), transactions (e.g., numbers or details of transactions), and tasks (e.g., a list of smart contracts). In some embodiments, the monitoring service may extract such information. In some embodiments, the monitoring service may generate a browser for browsing at least one of the status of the blockchain or the information associated with the blocks. For example, the browser may be implemented as a webpage for displaying the status or the information. For another example, the browser may further provide information on development and testing of blockchain applications.

In some embodiments, to automatic expand the blockchain, the one or more processors may repeatedly perform steps 302-310 (which may include steps 402-406), such that new virtual computing environments may be created for hosting new nodes of the blockchain.

Figure 5:
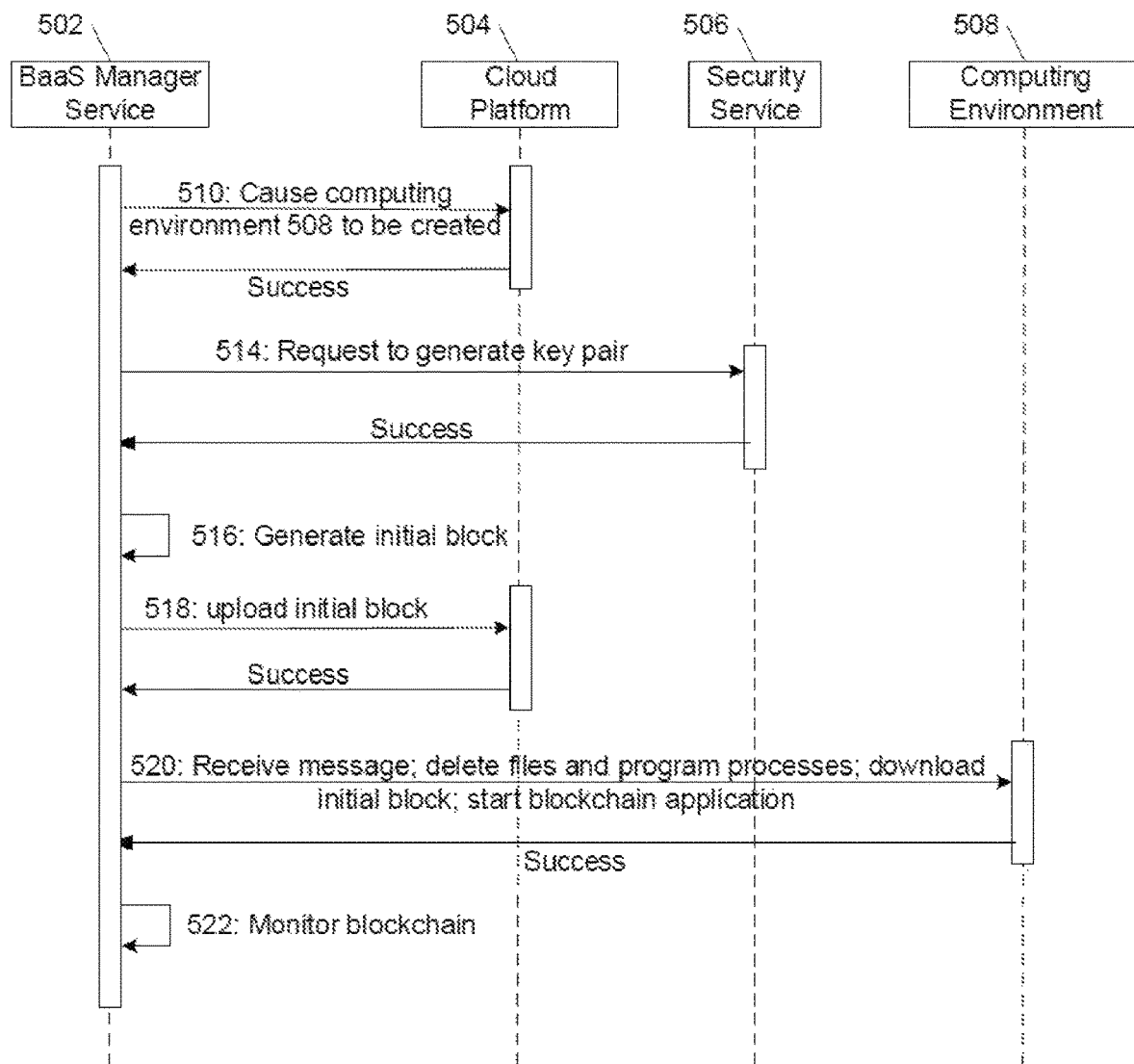
FIG. 5 is a flow chart of a method for automatic blockchain deployment, according to an embodiment.

FIG. 5 is a flow chart of a method 500 for automatic blockchain deployment, according to an embodiment. For example, the method 500 may be performed by a BaaS manager service 502, a cloud platform 504, a security service 506, and a computing environment 508. Although components 502-508 are presented separately in FIG. 5, they may all be implemented as a part of the cloud platform 504. For example, the BaaS manager service 502 and the security service 506 may be implemented as services of the cloud platform 504. The computing environment 508 may be the virtual computing environment described in FIGS. 2-4, which may or may not be part of the cloud platform 504.

In some embodiments, the BaaS manager service 502 may be implemented as a service of the BaaS system. For example, the BaaS manager service 502 may be used to implement the methods 300 (FIG. 3) and 400 (FIG. 4). In some embodiments, the computing environment 508 may be a separate system, such as an authentication server. For example, the computing environment 508 may be implemented as a certificate authority (CA) server. The computing environment 508 may issue and authenticate digital certificates for transaction activities conducted in the blockchain system. In some embodiments, the computing environment 508 may be entrusted by users of a consortium blockchain. In some embodiments, the computing environment 508 may be provided by a blockchain service provider, or by a third-party service provider.

Referring to FIG. 5, at step 510, the BaaS manager service 502 causes the cloud platform 504 to create the computing environment 508. For example, the BaaS manager service 502 may receive a network address of a computer connecting to a set of computers in the cloud platform 504, as described in step 302 (FIG. 3). The BaaS manager service 502 may further send the network address to the cloud platform 504 to create, using the network address, the computing environment 508 at the computer for deploying a blockchain, as described in step 304 (FIG. 3). When the computing environment 508 is successfully created, the cloud platform 504 may send a notification to the BaaS manager service 502 to indicate that. In some embodiments, the notification may be a message sent by the cloud platform 504 to a message queue (not shown) thereof and received by the BaaS manager service 502 from the message queue.

At step 514, the BaaS manager service 502 sends a request for generating a pair of a public key and a private key to the security service 506, for creating an identity of the computing environment 508, as described in step 304 (FIG. 3). When the key pair is successfully generated, the security service 506 may send a notification to the BaaS manager service 502 to indicate that. In some embodiments, the notification may be a message sent by the security service 506 to the message queue service of the cloud platform 504 and received by the BaaS manager service 502 from the message queue.

At step 516, the BaaS manager service 502 generates an initial block of the blockchain, as described in step 306 (FIG. 3). At step 518, the BaaS manager service 502 uploads the initial block to the cloud platform 504. For example, the BaaS manager service 502 may transmit the initial block to a storage (not shown) of the cloud platform 504, as described in step 306 (FIG. 3). When the initial block is successfully uploaded, the cloud platform 504 may send a notification to the BaaS manager service 502 to indicate that. In some embodiments, the notification may be a message sent by the cloud platform 504 to the message queue and received by the BaaS manager service 502 from the message queue.

At step 520, to initialize the blockchain, one or more processor cores of the computer environment 508 receive a message indicative of the completed uploading of the initial block from, e.g., the message queue, delete files (e.g., stored in a storage space) and program processes (e.g., running in a memory) that are not associated with the deployment of the current blockchain, download the initial block from the storage to the computer environment 508, and start a blockchain application using the initial block, as described in steps 402-406. When the blockchain is successfully initialized (e.g., completed without error), the computer environment 508 may send a notification to the BaaS manager service 502 to indicate that. In some embodiments, the notification may be a message sent by the computer environment 508 to the message queue service and received by the BaaS manager service 502 from the message queue.

At step 522, the BaaS manager service 502 monitors the blockchain. For example, the BaaS manager service 502 may use a monitoring service of the cloud platform 504, as described in step 310.

In some embodiments, in FIG. 5, to reduce communication overload, the message queue may be used only at step 518 for notifying the BaaS manager service 502 and the computing environment 508 that the uploading of the initial block to cloud platform 504 is completed. In some embodiments, the notifications in steps 510-516 and 520-522 may be implemented using other mechanisms other than the message queue. In some embodiments, the notifications in steps 510-516 and 520-522 may be omitted in the method 500, and steps 510-516 and 520-522 may be respectively performed in accordance with a predetermined temporal order (e.g., at predetermined times).

Figure 6:
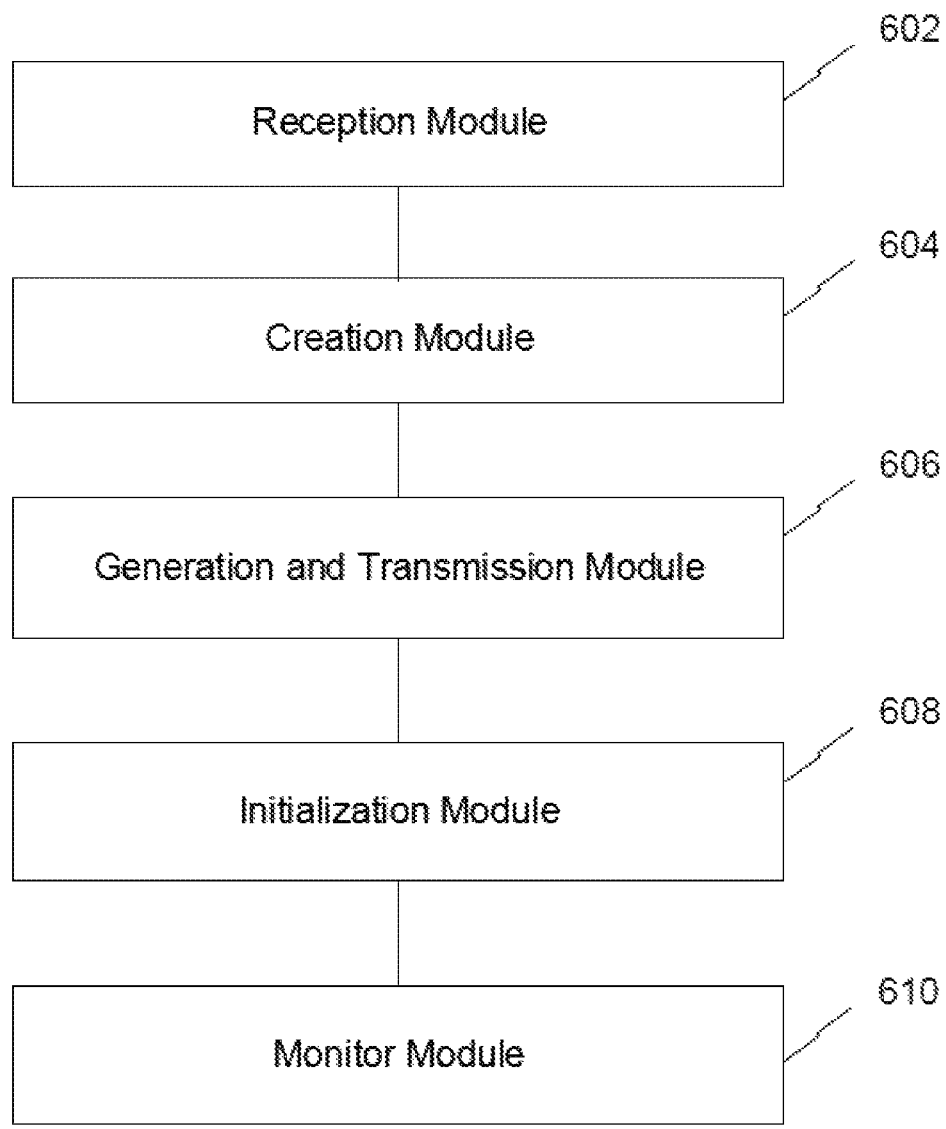
FIG. 6 is a block diagram of an apparatus for automatic blockchain deployment, according to an embodiment.

FIG. 6 is a block diagram of an apparatus 600 for automatic blockchain deployment, according to an embodiment. For example, the apparatus 600 may implement the methods 300 (FIG. 3) and 400 (FIG. 4). In some embodiments, the apparatus 600 may be implemented as the BaaS manager service 502 (FIG. 5). Referring to FIG. 6, the apparatus 600 includes a reception module 602, a creation module 604, a generation and transmission module 606, an initialization module 608, and a monitor module 610.

The reception module 602 may receive a network address of a computer connecting to a set of computers in a cloud platform, as described in step 302 (FIG. 3). The creation module 604 may cause, using the network address, a virtual computing environment to be created at the computer for deploying a blockchain, as described in step 304 (FIG. 3). The generation and transmission module 606 may generate an initial block of the blockchain and transmit the initial block to a storage of the cloud platform, as described in step 306 (FIG. 3). The initialization module 608 may initialize the blockchain at the virtual computing environment, as described in step 308 (FIG. 3) and steps 402-406 (FIG. 4). The monitor module 610 may monitor the blockchain using a monitoring service of the cloud platform in response to completed initialization of the blockchain, as described in step 310 (FIG. 3).

For an implementation process of functions and roles of each module in the apparatus 600, references can be made to corresponding steps in the above-described methods. Details are omitted here for simplicity.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 600 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible embodiments of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative embodiments, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for automatic blockchain deployment, the method comprising:
    transmitting an initial block of a blockchain to a cloud platform;
    causing the blockchain to be initialized at a virtual computing environment, the virtual computing environment being created at a computer connecting to the cloud platform; and
    after initialization of the blockchain is completed, monitoring the blockchain based on the cloud platform,
    wherein causing the blockchain to be initialized at the virtual computing environment comprises:
    in response to completed transmission of the initial block, sending a message indicative of the completed transmission to a message queue of the cloud platform, the message to be received by the virtual computing environment for initializing the blockchain.

2. The method of claim 1, wherein causing the blockchain to be initialized at the virtual computing environment comprises:
    causing the virtual computing environment to receive the initial block from a storage of the cloud platform and start a blockchain application using the initial block, based on the message indicative of the completed transmission of the initial block from the message queue.

3. The method of claim 2, further comprising:
    causing the virtual computing environment to delete at least one file or program process not associated with the blockchain.

4. The method of claim 1, further comprising:
    determining whether the sending the message to the message queue is completed;
    if it is determined that the sending the message to the message queue is completed, causing the blockchain to be initialized at the virtual computing environment; and
    if it is determined that the sending the message to the message queue is not completed, resending the message to the message queue after a predetermined period of time.

5. The method of claim 1, wherein causing the blockchain to be initialized at the virtual computing environment comprises:
    determining whether the transmitting of the initial block is completed;
    if it is determined that the transmitting of the initial block is completed, causing the blockchain to be initialized at the virtual computing environment; and
    if it is determined that the transmitting of the initial block is not completed, retransmitting the initial block to the cloud platform after a predetermined period of time.

6. The method of claim 1, further comprising:
    causing a pair of a public key and a private key to be generated, the pair representing an identity of the virtual computing environment; and
    in response to receiving one of the public key or the private key, generating the initial block.

7. The method of claim 6, further comprising:
    causing the public key to be stored at multiple virtual computing environments; and
    generating respective weights associated with the multiple virtual computing environments.

8. The method of claim 7, wherein generating the initial block comprises:
    receiving, from ones of the multiple virtual computing environments, public keys each corresponding to the public key of the virtual computing environment;
    determining a sum of weights associated with the ones of the multiple virtual computing environments; and
    based on a determination that the sum is greater than or equal to a threshold value, storing the received public keys and the weights in the initial block.

9. The method of claim 1, wherein causing the virtual computing environment to be created at the computer comprises:
    receiving a network address of the computer, the computer connecting to a set of computers in the cloud platform; and
    causing the cloud platform to create, based on the network address, the virtual computing environment at the computer.

10. The method of claim 9, wherein the network address of the computer includes an Internet Protocol (IP) address, and the IP address is different from IP addresses of the set of computers.

11. The method of claim 1, wherein the computer includes a computer in the cloud platform.

12. The method of claim 1, wherein the computer includes a computer not in any cloud platform, or a computer in an external cloud platform, wherein the external cloud platform includes a public cloud platform, a private cloud platform, and a hybrid cloud platform.

13. The method of claim 1, wherein monitoring the blockchain based on the cloud platform comprises:
    monitoring a status of the blockchain, wherein the status includes at least one of a synchronization status of blocks of the blockchain or a height of the blocks in the virtual computing environment;
    extracting information associated with the blocks from the blockchain; and
    generating a browser for browsing at least one of the status of the blockchain or the information associated with the blocks.

14. The method of claim 1, wherein causing the virtual computing environment to be created at the computer comprises:

applying a distributed lock to shared resources of the computer;

causing the virtual computing environment to be created using the shared resources of the computer; and releasing the distributed lock.

15. The method of claim 1, wherein the virtual computing environment includes a processor core of a physical machine, a portion of a memory of the physical machine, and a network interface.

16. The method of claim 1, wherein the initial block includes at least one of a network address of the virtual computing environment, a port number of the virtual computing environment, an identity of the virtual computing environment, or an initial smart contract.

17. The method of claim 16, wherein the initial smart contract includes at least one of a configuration smart contract for configuring blocks in the blockchain or a node smart contract for setting node configurations in the blockchain.

18. A device for automatic blockchain deployment, the device comprising:

one or more processors; and one or more computer-readable memories coupled to the one or more processors and having instructions stored thereon that are executable by the one or more processors, wherein the one or more processors are configured to:

transmit an initial block of a blockchain to a cloud platform;

cause the blockchain to be initialized at a virtual computing environment, the virtual computing environment being created at a computer connecting to the cloud platform; and after initialization of the blockchain is completed, monitor the blockchain based on the cloud platform, wherein in causing the blockchain to be initialized at the virtual computing environment, the one or more processors are further configured to:

in response to completed transmission of the initial block, send a message indicative of the completed transmission to a message queue of the cloud platform, the message to be received by the virtual computing environment for intializing the blockchain.

19. A non-transitory computer-readable medium having stored therein instructions that, when executed by a processor of a device, cause the device to perform a method for automatic blockchain deployment, the method comprising:

transmitting an initial block of a blockchain to a cloud platform;

causing the blockchain to be initialized at a virtual computing environment, the virtual computing environment being created at a computer connecting to the cloud platform; and after initialization of the blockchain is completed, monitoring the blockchain based on the cloud platform, wherein causing the blockchain to be initialized at the virtual computing environment comprises:

in response to completed transmission of the initial block, sending a message indicative of the completed transmission to a message queue of the cloud platform, the message to be received by the virtual computing environment for initializing the blockchain.

* * * * *

UNITED STATES PATENT AND TRADEMARK OFFICE
CERTIFICATE OF CORRECTION

PATENT NO. : 11,128,470 B2
APPLICATION NO. : 16/887838
DATED : September 21, 2021
INVENTOR(S) : Ming Zhu It is certified that error appears in the above-identified patent and that said Letters Patent is hereby corrected as shown below:

In the Claims

Claim 18, Column 20, Line 10, "intializing" should read --initializing--.

Signed and Sealed this
Twenty-seventh Day of December, 2022

Katherine Kelly Vidal
Director of the United States Patent and Trademark Office